(12) United States Patent
Loveland

(10) Patent No.: US 8,712,432 B2
(45) Date of Patent: Apr. 29, 2014

(54) METHOD AND SYSTEM FOR TRACKING MOBILE ELECTRONIC DEVICES WHILE CONSERVING CELLULAR NETWORK RESOURCES

(75) Inventor: Damien Gerard Loveland, Richmond (CA)

(73) Assignee: Absolute Software Corporation, Vancouver, British Columbia ( * ) Notice: Subject to any disclaimer, the term of this patent is extended or adjusted under 35 U.S.C. 154(b) by 0 days.

(21) Appl. No.: 13/175,769

(22) Filed: Jul. 1, 2011

(65) Prior Publication Data

US 2012/0003991 A1  Jan. 5, 2012

Related U.S. Application Data

(60) Provisional application No. 61/360,906, filed on Jul. 1, 2010.

(51) Int. Cl.
*H04W 24/00* (2009.01)
(52) U.S. Cl.
USPC .................. 455/456.1; 455/456.5; 455/456.6
(58) Field of Classification Search
USPC ........ 455/404.2, 414.1, 414.2, 418, 419, 420, 455/421, 422.1, 432.1, 445, 456.1–456.6; 726/26, 27, 29, 34, 35
See application file for complete search history.

(56) References Cited

U.S. PATENT DOCUMENTS

| | | | |
|---|---|---|---|
| 6,205,126 B1 * | 3/2001 | Moon | 370/329 |
| 6,300,863 B1 | 10/2001 | Cotichini et al. | |
| 6,393,275 B1 | 5/2002 | Alfred | |
| 6,449,483 B1 | 9/2002 | Akhteruzzaman et al. | |
| 6,625,457 B1 | 9/2003 | Raith | |
| 6,687,605 B1 | 2/2004 | Wako | |
| 7,127,239 B2 | 10/2006 | Ogman et al. | |
| 7,146,666 B2 | 12/2006 | Christofferson et al. | |
| 7,164,666 B2 | 1/2007 | Bunn et al. | |
| 7,346,156 B1 | 3/2008 | Choupak et al. | |
| 7,610,047 B2 | 10/2009 | Hicks, III et al. | |
| 7,627,338 B2 | 12/2009 | Hicks, III et al. | |
| 7,684,782 B2 * | 3/2010 | Ashley et al. | 455/404.2 |
| 7,711,101 B2 | 5/2010 | Benveniste | |
| 8,065,511 B2 * | 11/2011 | Bhansali et al. | 713/2 |
| 2002/0110098 A1 * | 8/2002 | Bunn et al. | 370/329 |
| 2003/0186676 A1 | 10/2003 | Ogman et al. | |
| 2006/0075263 A1 * | 4/2006 | Taylor | 713/194 |
| 2008/0115226 A1 * | 5/2008 | Welingkar et al. | 726/28 |
| 2008/0211670 A1 * | 9/2008 | Gordon | 455/466 |
| 2009/0124267 A1 * | 5/2009 | del Castillo | 455/456.6 |
| 2010/0100972 A1 * | 4/2010 | Lemieux et al. | 726/34 |
| 2010/0216463 A1 | 8/2010 | Jalil et al. | |

\* cited by examiner

*Primary Examiner* — Kent Chang
*Assistant Examiner* — Nelson Rosario
(74) *Attorney, Agent, or Firm* — Knobbe, Martens, Olson & Bear, LLP

(57) ABSTRACT

A system and associated methods are disclosed for tracking mobile electronic devices while conserving cellular network resources used for such tracking. The tracking may be performed for purposes of facilitating recovery of lost or stolen devices. To conserve network resources, different telephone numbers may be assigned depending upon the location of each device and the time of each call, and individual calls may be made only after a determination has been made that a telephone call is required. A determination that a telephone call is required may be made depending upon whether a protected electronic device had been reported lost or stolen, and/or whether an internet communication between the protected electronic device and a monitoring center has been made within a selected previous period of time. A dynamic schedule permits reserved telephone call slots to be freed up if not needed so that they can be used for devices that need the communication time.

19 Claims, 4 Drawing Sheets

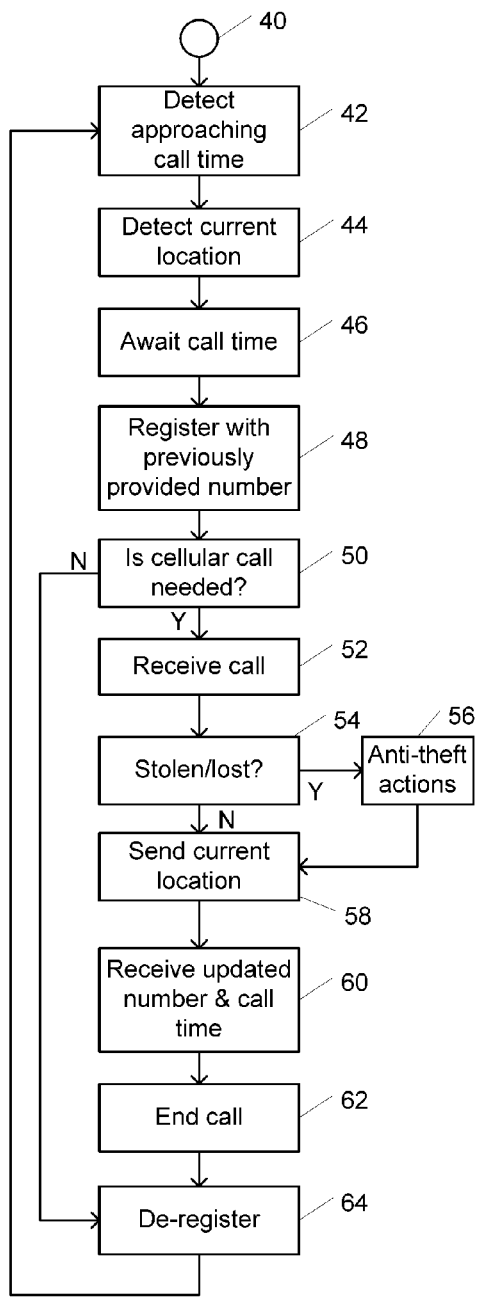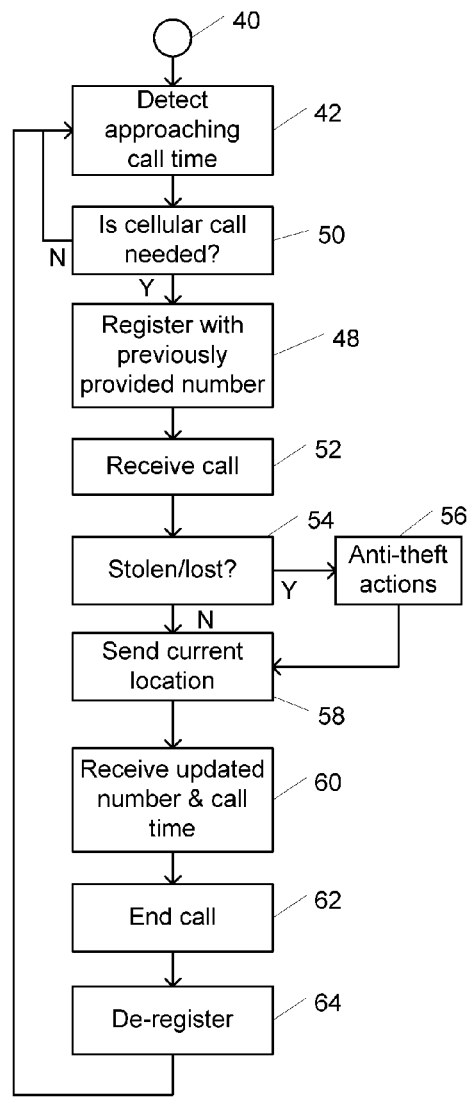
FIG. 2
FIG. 3

METHOD AND SYSTEM FOR TRACKING MOBILE ELECTRONIC DEVICES WHILE CONSERVING CELLULAR NETWORK RESOURCES

CROSS-REFERENCE TO RELATED APPLICATION

This application claims the benefit of U.S. Provisional Patent Application No. 61/360,906, filed Jul. 1, 2010, the disclosure of which is hereby fully incorporated by reference.

BACKGROUND

The present disclosure relates to the sharing of telephone numbers used for tracking electronic devices.

Laptops, and increasingly other electronic devices such as cell phones, personal digital assistants (i.e. "PDAs"), smart phones (e.g. BlackBerry™, iPhone™), memory sticks, electronic books, personal media devices (e.g. iPod™), gaming devices, tablet computers and personal computers, are being remotely tracked so that they can be recovered in the event of theft. Such tracking may be effected by sending location information to a remote storage site or an email server via a wireless telephone connection and/or via the internet.

Proprietary information is routinely stored on electronic devices, and the need to protect such proprietary or sensitive data, and to recover such devices if they are lost or stolen, is self-evident. However, the use of telecommunications channels should be used efficiently in order to keep down the cost of tracking.

U.S. Pat. No. 7,164,666 to Bunn discloses a system and method for multiplexing wireless devices. In a form of TDMA (time division multiple access), multiple devices can share the same ESN (Electronic Serial Number) and MIN (Mobile Identification Number) by operating in turn on a single channel. A GPS clock may be used to synchronize all the devices.

U.S. Patent Application Publication Number 2008/0211670 discloses a system in which protected host devices can communicate with a monitoring center via two different cellular channels.

U.S. Pat. No. 6,625,457 to Raith discloses a system in which cellular telephones are automatically updated with different numbers to call, based on the detected location of the phone.

SUMMARY

This summary is not an extensive overview intended to delineate the scope of the subject matter that is described and claimed herein. The summary presents aspects of the subject matter in a simplified form to provide a basic understanding thereof, as a prelude to the detailed description that is presented below.

The subject matter described herein provides a system, method and apparatus for allowing multiple protected electronic devices to time-share telephone numbers while communicating with a monitoring center. A dynamic schedule permits reserved telephone call slots to be freed up if not needed so that they can be used for devices that need the communication time.

To conserve network resources, different telephone numbers may be assigned depending upon the location of each device and the time of each call, and individual calls may be made only after a determination has been made that a telephone call is required. In embodiments of the described subject matter, the determination that a telephone call is required may be made depending upon whether a protected electronic device had been reported lost or stolen, and/or whether an internet communication between the protected electronic device and a monitoring center has been made within a selected previous period of time. In some embodiments, a telephone call is made upon the expiry of a pre-defined lag period following an unsuccessful internet communication between a protected electronic device and the monitoring center.

Information communicated to a monitoring center may comprise, for example, IP addresses, GPS coordinates, Wi-Fi signal strengths, cell tower signal strengths, street addresses, times at these locations and/or time spent at these locations. In addition to the location information, identification indicia for the device may also be provided. Proprietary data may also be transmitted back to the monitoring center, or to the owner of the device, in the event that the device is lost or stolen. Instructions may be given along the communication channel to freeze the device, delete data, encrypt data or delete encryption keys. Photos or screen shots may also be transmitted from the electronic device that has been lost or stolen.

BRIEF DESCRIPTION OF THE DRAWINGS

For a fuller understanding of the nature and advantages of the disclosed subject matter, as well as the preferred mode of use thereof, reference should be made to the following detailed description, read in conjunction with the accompanying drawings. In the following drawings, like reference numerals designate like or similar parts or steps.

FIG. 2 is a functional flow diagram schematically representing the flow process of a host in accordance with embodiments of the disclosed subject matter.

FIG. 3 is a functional flow diagram schematically representing the flow process of a host in accordance with other embodiments of the disclosed subject matter.

DETAILED DESCRIPTION OF SPECIFIC EMBODIMENTS

A. Terminology

Figure 1:
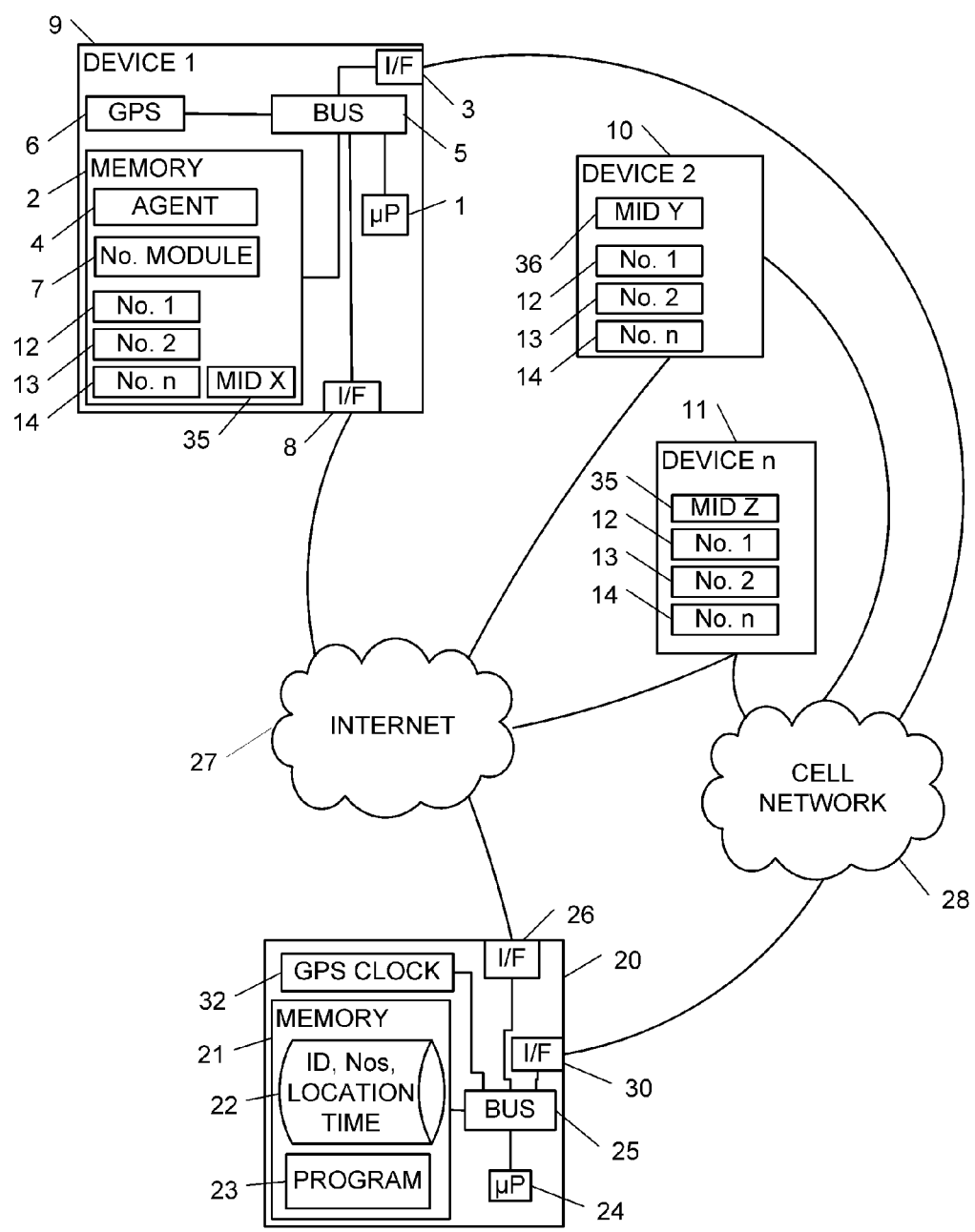
FIG. 1 is a schematic functional diagram of a system for allowing multiple protected electronic devices to time-share telephone numbers while communicating with a monitoring center in accordance with an embodiment of the disclosed subject matter.

Agent—As used herein, is a software, hardware or firmware agent that is ideally persistent and stealthy, and that resides in a computer or other electronic device. The agent preferably provides servicing functions which involve communication with a monitoring center or remote server. The agent is preferably tamper resistant and may be enabled for supporting and/or providing various services such as data delete, firewall protection, data encryption, location tracking, message notification, and software deployment and updates.

An illustrative embodiment of an agent is found in the commercially available product Computrace Agent™. The technology underlying the Computrace Agent™ has been disclosed and patented in the U.S. and other countries, which patents have been commonly assigned to Absolute Software Corporation. See, for example, U.S. Pat. Nos. 5,715,174; 5,764,892; 5,802,280; 6,244,758; 6,269,392; 6,300,863; 6,507,914; 7,818,803; 7,945,709 and related foreign patents. Details of the persistent function of an agent are disclosed in U.S. Patent Application Publication Nos. US2005/0216757 and US2006/0272020. The technical disclosures of these documents are fully incorporated by reference as if fully set forth herein. It is feasible to use an equivalent agent to the Computrace Agent™, or less preferably an alternative agent with less functionality. For the purposes of the present disclosure, the minimal functional attributes of the agent are to facilitate communications between the electronic device and a monitoring center. Communications may be initiated by the agent, by the monitoring center or by both.

Host—This is the electronic device to be protected. Examples of a host include a laptop, a netbook, a cell phone, a smart phone (e.g. BlackBerry™, iPhone™), a personal digital assistant (i.e. "PDA"), a memory stick, an electronic book, a personal media device (e.g. iPod™), a gaming device, a tablet and a personal computer. The agent resides in the host.

Monitoring Center—This is a remote guardian server or other computer or server that the agent communicates with or sends a message to. It may be an email server or it may be a distribution of servers or other computers, and may refer to an office comprising such servers together with staff that can take telephone calls and/or investigate data communicated from the host to the monitoring center. For example, provided an internet connection is available to the host, an agent may call the monitoring center at some selected suitable interval to report the location of the host, download software upgrades if there are any and repair any security modules that are or should be installed on the host. In the embodiments disclosed herein, the agent would conditionally upload to remote storage of the monitoring center location information and/or any other data desired to be transferred from lost or stolen host devices. Communication to the monitoring center may take place, for example, via the internet, a wired or wireless telephone network, WIFI, WIMAX, cable or satellite.

The detailed descriptions within are presented largely in terms of methods or processes, symbolic representations of operations, functionalities and features of the invention. These method descriptions and representations are the means used by those skilled in the art to most effectively convey the substance of their work to others skilled in the art. A software implemented method or process is here, and generally, conceived to be a self-consistent sequence of steps leading to a desired result. These steps involve physical manipulations of physical quantities. Often, but not necessarily, these quantities take the form of electrical or magnetic signals capable of being stored, transferred, combined, compared, and otherwise manipulated. It will be further appreciated that the line between hardware, software and firmware is not always sharp, it being understood by those skilled in the art that software implemented processes may be embodied in hardware, firmware, or software, in the form of coded instructions such as in microcode and/or in stored programming instructions. Programming instructions used for implementing embodiments of the described subject matter may be defined in one or more languages such as C++, Basic, Java, or variations of these. In general, unless otherwise indicated, singular elements may be in the plural and vice versa with no loss of generality. The use of the masculine can refer to masculine, feminine or both.

B. General System

Referring to FIG. 1, an example system is shown. The system comprises a plurality of host electronic devices 9, 10, 11 which may be computing devices such as laptops or smart phones. A typical host 9 has a processor 1, in operative communication with an electronic storage device (i.e. memory) 2 via a bus 5. The memory 2 may store programs, such as agent 4 and call number module 7, that can be interpreted, accessed or processed by processor 1. The memory 2 may also store data, such as one or more host telephone numbers 12, 13, 14 that can be used by the one or more programs 4, 7 present in the memory 2.

The telephone numbers 12, 13, 14 may be stored in the memory 2 of the host 9 concurrently, or they may be stored in memory 2 of the host 9 one at a time. The telephone numbers 12, 13, 14 are the numbers of the host 9. The agent 4 in the host 9 may initiate a call to the monitoring center 20 from one or more of the outgoing host telephone numbers 12, 13, 14.

The host 9 is also in operative communication with a location device such as a GPS device 6. Other location devices are possible, and may include software, firmware or hardware or a combination of these. The location device 6 may be contained within host 9 as shown, or may be partially or entirely located outside of the host 9 and the host 9 may comprise means for receiving location information from such an external locating device. For example, the host 9 may be configured to detect Wi-Fi signal strengths and signatures, send information pertaining to these to a remote server and receive back meaningful location data.

The host 9 may typically include an interface 3 via which it communicates with other electronic devices, networks or servers. In particular, a host 9 may be connected or be connectable to a cellular telephone network 28. It may also be connected or be connectable via another interface 8 to the internet 27. It may also communicate via a cellular network that is connected to the internet.

Other hosts 10, 11 are illustrated as being connected, or connectable, to the networks 27, 28. These hosts 10, 11 can share one or more telephone numbers 12, 13, 14 with host 9. Again, the telephone numbers may be stored at the same time in the hosts 10, 11 or they may be stored one at a time. The hosts 10, 11 may initiate calls to the monitoring center 20 from one or more of the telephone numbers 12, 13, 14. The present system is configured such that a given host telephone number 12, 13, 14 is only in use by one host 9, 10, 11 at a time.

Each host device 9, 10, 11 has a Mobile ID (MID) 35, 36, 37 using which it can register with a cellular telephone network 28. It may be the case that all the MIDs are different, or for a certain group of hosts 9, 10, 11 they may be the same (i.e. MID X=MID Y=MID Z). The MIDs may be variable, in that they can be assigned in full or in part by the monitoring center. The MID may be a Mobile Identification Number (MIN), which is a unique number that a wireless operator uses to identify the mobile phone. The MID may be a combination of an Electronic Serial Number (ESN) and a MIN. A MIN may be hard coded into each host device.

The monitoring center 20 may be a server or other computer, and may include multiple computing devices that communicate over a network. It typically comprises a processor 24 connected via a bus 25 to an electronic storage device 21. The storage device (i.e. memory) 21 can contain data 22 (e.g. host telephone numbers, most cost effective host telephone number for each location, host IDs, host locations and times at these locations) and/or programs 23 that can be processed by the processor 24. Monitoring center 20 may also comprise an interface 26 for communicating via the internet 27, or an interface 30 for communicating via a cellular network 28.

If the monitoring center 20 initiates calls to the hosts 9, 10, 11, or if the monitoring center identifies calling hosts based on the time that they call, the monitoring center 20 may also comprise a GPS clock 32 so that it can remain synchronized with the hosts 9, 10, 11. If the hosts are all configured to call the monitoring center and identify themselves, rather than being called by the monitoring center, then GPS clock 32 may not be needed.

C. General Method

FIG. 2 shows an exemplary process that a host 9 may perform in order to facilitate its tracking. After the start of the process 40, for example after power is supplied to part or all of the host 9, the agent 4 detects 42 that a cellular call time is approaching. The current location of the host 9 is then detected 44 by a GPS module 6 and the pre-arranged call time is awaited 46. The current time can be retrieved from the GPS module 6, typically to an accuracy of a second, or a clock in the host may be used. At, or just before the pre-arranged call time, the agent 4 causes the host to register 48 with a cellular telephone network, with a pre-arranged telephone number 12, 13, or 14 in FIG. 1.

If 50 a cellular call is not actually needed, which may be determined at the monitoring center 20, then no call is completed. This could be because the host 9 and monitoring center 20 have recently communicated via a different means such as the internet, or because no alert has been created at the monitoring center. If 50 a call is needed, then the host 9 can receive 52 a call from the monitoring center 20.

In the case that the host 9 receives 52 a call from the monitoring center 20, the monitoring center may communicate a signal to the host 9 indicating that it has been reported lost or stolen. If 54 the host 9 has been reported as stolen, then the host 9 can commence 56 anti-theft actions. These actions may be one or more of shutting down the host, deleting encryption keys, changing encryption keys, deleting some or all the data in the host 9, transmitting data from the host 9, sounding an alarm, displaying a message on a display of the host 9, taking photographs using a camera built into the host 9, sending location related information to the monitoring center 20, informing nearby devices or other hosts 10, 11 that it has been reported lost or stolen, etc. The host 9 may also loop out of the process if it has been reported stolen, but this is optional.

If the process is continued after anti-theft action(s) have been initiated 56, or if the host 9 has not been reported lost or stolen, then agent 4 reports 58 the most recently detected location of the host 9 to the monitoring center 20, if it has not already done this in step 56. Based on the location information transmitted 58 to the monitoring center 20, the monitoring center 20 can update 60 the number that the host 9 should use next time a call needs to be made. For example, if the location of the host 9 has changed significantly since the preceding call, then it would be beneficial from a cost point of view to change the number the host 9 uses in order to avoid possible roaming and/or long distance charges. The call number module 7 in the host 9 may manage the host telephone number to be used in a cellular call. The monitoring center 20 may include a database of numbers to be used depending on the location of the hosts 9, 10, 11. In addition to the host telephone number 12, 13, or 14 that the host 9 uses for itself, it may be provided with another telephone number (not shown) on which to contact the monitoring center in the case where the hosts 9, 10, 11 are configured to call the monitoring center 20. Again, this would be for minimizing long distance and/or roaming charges. The monitoring center may also transmit 60 the next time that a communication should be made by cellular telephone, which may be conditional upon the absence of an intervening internet communication, the scheduled time of which may also be transmitted. The updated host telephone number and time will be used by the host 9 on the next occasion it registers with a cellular telephone network. When the necessary communications between the host 9 and the monitoring center 20 have been completed, the call is ended 62 and the host 9 de-registers 64 from the cellular network. The process then loops back to step 42 to detect the subsequent reserved cellular call time.

FIG. 3 shows an alternate exemplary process that a host 9 may perform in order to facilitate its tracking. Many of the steps are the same as those of the process shown in FIG. 2. After the start of the process 40, the agent 4 detects 42 that a cellular call time is approaching. If 50 a cellular call is not needed, which may have been determined at the host 9 or the monitoring center 20 during a prior internet call, then no cellular call is made.

If 50 a call is needed, then at, or just before the pre-arranged call time, the agent 4 causes the host to register 48 with a cellular telephone network with a pre-arranged telephone number 12, 13, or 14. The host 9 can then initiate the call to the monitoring center 20, or it can receive 52 a call from the monitoring center 20. Whether the hosts 9, 10, 11 call the monitoring center 20 or whether the monitoring center 20 calls the hosts 9, 10, 11 depends on the configuration chosen for the system.

In the case that the host 9 receives 52 a call from the monitoring center 20, the monitoring center may communicate a signal to the host 9 indicating that it has been reported lost or stolen. If 54 the host 9 has been reported as stolen, then the host 9 can commence 56 anti-theft actions as described above.

If the process is continued after anti-theft action(s) have been initiated 56, or if the host 9 has not been reported lost or stolen, then agent 4 reports 58 the most recently detected location of the host 9 to the monitoring center 20, if it has not already done so in step 56. Based on the location information transmitted 58 to the monitoring center 20, the monitoring center 20 can update 60 the number that the host 9 should use next time a call needs to be made. The monitoring center may transmit 60 the next time that a communication should be made by cellular telephone, which may be conditional upon the absence of an intervening internet communication, the scheduled time of which may also be transmitted. When the necessary communications between the host 9 and the monitoring center 20 have been completed, the call is ended 62 and the host 9 de-registers 64 from the cellular network. The process then loops back to step 42 to detect the approach of the subsequent reserved cellular call time.

Figure 4:
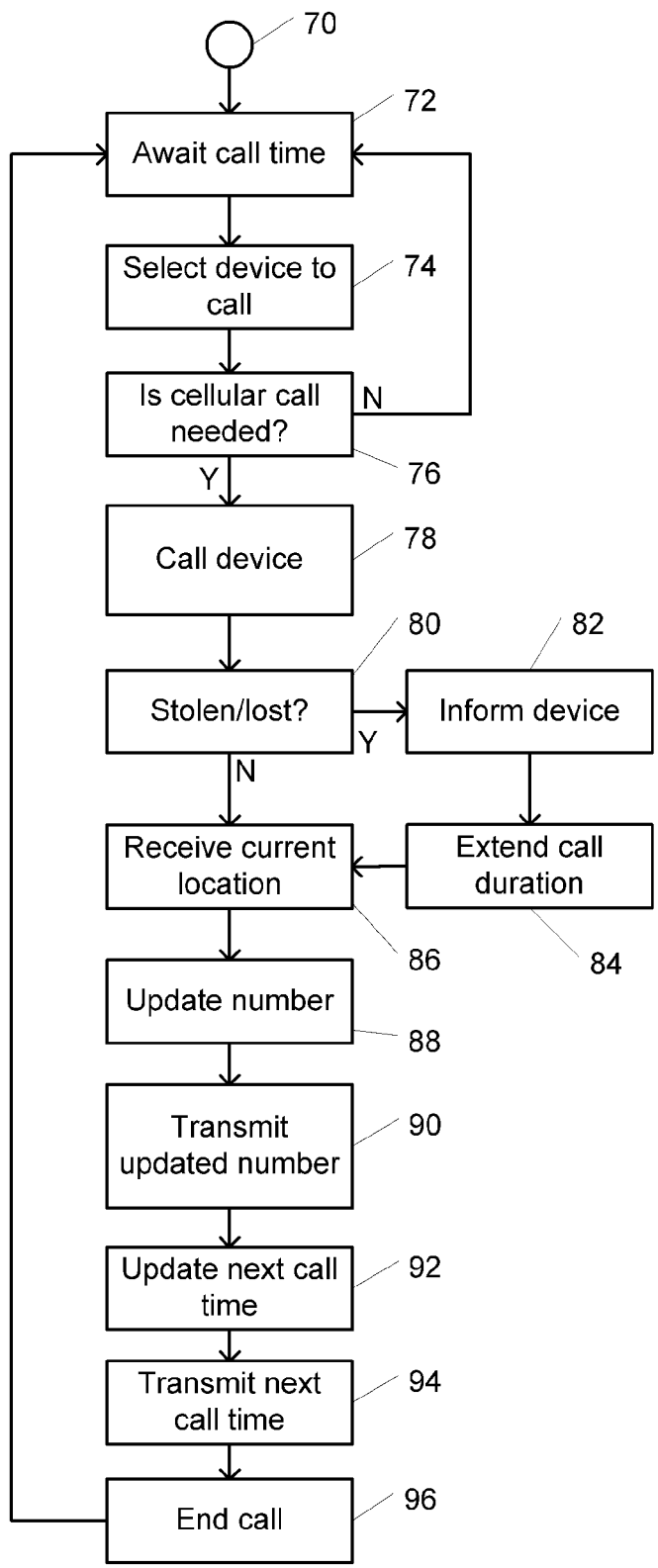
FIG. 4 is a functional flow diagram schematically representing the flow process of a monitoring center in accordance with embodiments of the disclosed subject matter.

FIG. 4 shows an example process that a monitoring center 20 may perform. After the start of the process 70, the monitoring center selects 74 a host device that should be called according to an ongoing, live or pre-defined schedule. The monitoring center 20 determines 76 whether or not a cellular call is needed. If, for example, the host 9 scheduled for a call has recently contacted the monitoring center 20, for example via the internet, then a call may not be necessary and the monitoring center 20 loops back to await 72 execution of the next selection step 74 in accordance with the ongoing, live or pre-defined schedule. However, if the host 9 has not recently contacted the monitoring center 20, or the host 9 has missed its scheduled time for contacting the monitoring center 20, then a cellular call may be necessary. Even if the host 9 has recently communicated with the monitoring center 20, then a cellular call may be due if the host 9 has been reported stolen or lost.

If a call is due, then the monitoring center 20 calls 78 the host 9. In an alternate embodiment, the monitoring center 20 may receive a call from a host 9. If 80 the host 9 has been reported stolen or lost, then the monitoring center 20 informs 82 the host 9 of its lost/stolen status. If it is possible and/or necessary, then the monitoring center 20 can optionally also inform 84 the host 9 that the present call can be extended beyond its normal scheduled duration. Whether a call can be extended depends on the configuration of the system. This could depend, for example, on whether reserved calling time slots that are not likely to be needed are made available or not to lost or stolen devices. The monitoring center 20 then receives 86 the current location of the host 9. If 80 the host 9 has not been reported stolen, then the monitoring center 20 receives 86 the current location of the host 9 without executing steps 82 or 84. In an alternate embodiment, the monitoring center 20 may inform the host 9 of its status on each call.

The telephone number the host should use for itself on the subsequent call is then updated 88 at the monitoring center 20 and transmitted 90 to the host 9. Alternately, an identifier for the update number may be transmitted from the monitoring center 20 to the host 9. The monitoring center 20 has a table or database 22 containing host telephone numbers that the hosts can use depending on their last known location. The numbers are chosen and provided to minimize long distance and/or roaming charges for a plurality of hosts 9, 10, 11 that are monitored.

In step 92, the next scheduled cellular call time is updated 92 in the monitoring center 20 and transmitted 94 to the host 9. The call is then ended 96 and the monitoring center 20 loops back to await 72 execution of the next selection step 74 in accordance with the ongoing, live or pre-defined schedule.

Figure 5:
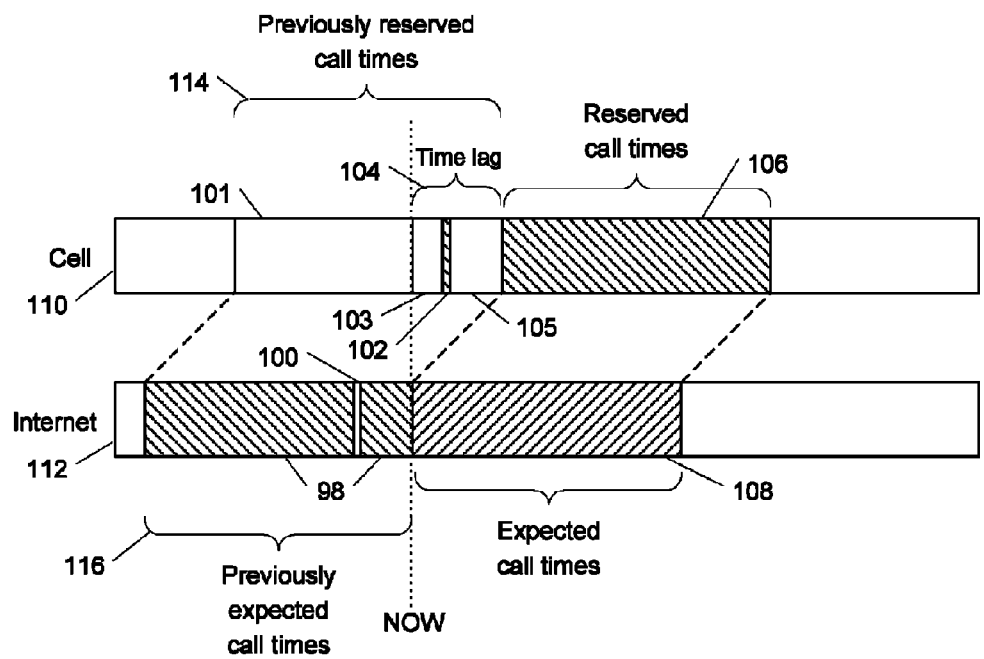
FIG. 5 is a use-case diagram schematically representing the calling timeline of a system and method in accordance with an embodiment of the disclosed subject matter.

FIG. 5 shows a diagram of cellular calling timeline 110 and internet calling timeline 112, on which calls between the monitoring center 20 and the hosts 9, 10, 11 may occur. Normally, a host 9 is configured to call into the monitoring center 20 via the internet (i.e. a mobile data network that is distinct from the cellular network) in preference to the cellular network. For example a group of hosts may be scheduled to call the monitoring center via the internet during a certain future time period 108. Reserved call times 106 for calls via a cellular network are scheduled to be later than expected call times 108. A reserved cellular call time may be scheduled after an expected internet call time by a predefined time lag 104. If one or more hosts do not call the monitoring center 20 via the internet during the expected time period 108, the one or more hosts can later communicate with the monitoring center during a corresponding slot in reserved call time period 106.

As an example, a group of hosts were previously expected to call in to the monitoring center 20 during time period 116 occurring in the past. The previously reserved period 114 for calling via the cellular network was scheduled to occur later than the previously expected internet calling times 116 by a time delay equal to the time lag 104. As it happened in this case, all but one of the hosts called into the monitoring center in time periods 98 occurring within time period 116. The one host that did not call in missed its call via the internet at time 100, but will be able to communicate with the monitoring center 20 at future time 102, occurring later than the initially scheduled call time 100 by a period equal in duration to the time lag 104. Since the majority of hosts 9 communicated via the internet in time periods 98, the corresponding previously reserved cellular calling times 101, 103 and 105 may not be used. However, since a cellular call is still expected at time 102, and it is known that previously reserved cellular call time period 105 is now available, it is possible for the cellular call due to occur at time 102 to be extended in duration to use some of the freed up cellular time 105.

As time progresses and hosts continue to make calls via the internet, then reserved cellular call times 106 will be freed up, allowing lost or stolen devices to communicate via a cellular network more frequently than previously scheduled. Depending on the number of hosts to be protected, the duration of the calls and the number of hosts that are reported lost or stolen, the period for the expected call time 108 for the group of hosts can be increased or decreased, as can be the corresponding duration of the reserved call times 106. This can occur dynamically and can be controlled via the employment of an algorithm at the monitoring center 20. Although only one set of reserved call times 106 is shown, two or more sets could be reserved.

During an internet call, the immediately following reserved cellular call time for the host that is calling could be sacrificed, or freed up. This could be communicated to the host 9 by the monitoring center 20. If it happens that enough hosts are not making internet call for the cellular channel to be in full use, or near full use, then some of the hosts could be given an alternate cellular number to use.

Figure 6:
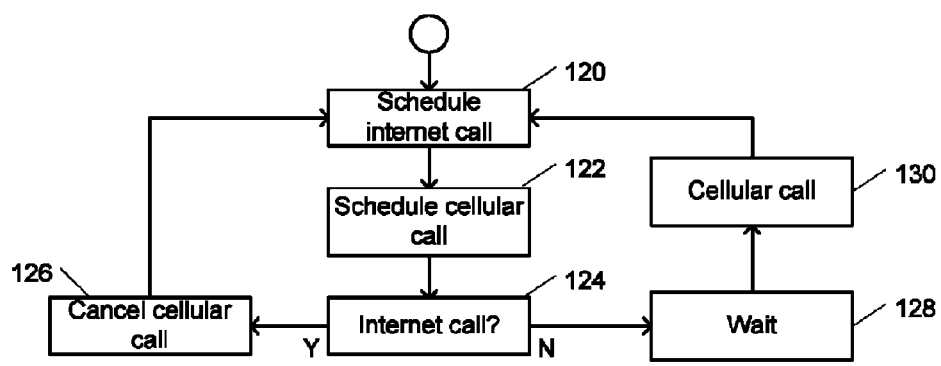
FIG. 6 is a functional flow diagram schematically representing the flow process of a monitoring center in accordance with embodiments of the disclosed subject matter.

FIG. 6 shows a process that may be undertaken by the monitoring center 20 when scheduling cellular call times. In step 120, the monitoring center schedules the next internet call time for a device. A series of future internet calls may be scheduled at the same time. In step 122, the monitoring center schedules the next cellular call time for a device. A series of future cellular calls may be scheduled at the same time. When it come time for an internet communication to be made between the monitoring center and the device, if it occurs 124, the next scheduled cellular call time is cancelled 126 and if not already done in advance, the following internet call is scheduled 120 as well as the following cellular call 122. If at point 124 there is no internet call made, then the monitoring center waits 128 until the scheduled cellular call time. The cellular call is then made 130 during which the following internet and cellular call times are scheduled 120, 122, if they have not been scheduled in advance.

D. Alternatives and Variations

Steps in the flowcharts may be performed in a different order to those illustrated, or they may be combined where shown separately. Some steps may be omitted in some embodiments. Components may be interchanged for equivalents, or varied in number and type.

Communications may be initiated by either the host 9 or the monitoring center 20. However, if the monitoring center 20 calls, then it can be more certain that only one device in a group of host devices will be involved in a communication at a time.

Actions taken by the protected host may be undertaken stealthily, such that an unauthorized user of the host is unaware that the action is being taken. Alternately, an action may be overt, such as accompanied by the sounding of an alarm.

The timing of the calls can be scheduled with some allowance for timing error. For example, if the timing accuracy of the GPS clocks is Δt, then subsequent calls can be scheduled with a gap of say 10Δt, or some other multiple such as 5 or 20 etc.

It may be possible to reserve two or more cellular call times for each host in a reserved call time period 106. Time periods 108, 106, 116 and 114 may not be scheduled to be filled to capacity, which would allow multiple cellular calls to be scheduled. It may be the case that different hosts, or hosts in different locations, need to make more frequent calls. For example, automatic detection that a host is being taken through an airport, or is in an area of increased crime, may cause call frequency to be increased.

The time period 106 may be interspersed with one or more unscheduled time periods which are reserved for devices that have been reported lost or stolen and may need extra call time.

It may be possible, in the case of a reported loss or theft, to instruct the host to communicate via another channel that is dedicated to communicating with lost and stolen devices, rather than sharing a channel with host devices that are not lost or stolen.

Except where indicated otherwise, all of the steps and tasks described herein may be performed and fully automated by a computer system, and may be embodied in software code modules executed by one or more general purpose computers. The code modules may be stored in any type of computer-readable medium or other computer storage device. Some or all of the methods may alternatively be embodied in specialized computer hardware. The computer system may, in some cases, be composed of multiple distinct computers or computing devices (e.g., physical servers, workstations, storage arrays, etc,) that communicate and interoperate over a network to perform the described functions. Each such computing device typically includes a processor (or multiple processors) that executes program instructions stored in a memory or other computer-readable medium. The results of the disclosed methods may be persistently stored by transforming physical storage devices, such as solid state memory chips and/or magnetic disks, into a different state.

The present description is of the best presently contemplated mode of carrying out the subject matter disclosed and claimed herein. The description is made for the purpose of illustrating the general principles of the subject matter and not be taken in a limiting sense; the subject matter can find utility in a variety of implementations without departing from the scope of the disclosure made, as will be apparent to those of skill in the art from an understanding of the principles that underlie the subject matter.

The invention claimed is:

1. A non-transitory computer-readable medium having stored thereon an executable agent component that directs a mobile electronic device to communicate with a monitoring center according to a protocol in which:

during a first time period, the mobile device attempts to establish a communication session with the monitoring center over a computer network without use of a cellular network;

if the attempt to establish the communication session over the computer network is unsuccessful, a call is placed over the cellular network between the mobile device and the monitoring center during a scheduled call time by connecting from a telephone number that is time-shared by multiple mobile devices, said scheduled call time falling after expiration of a time lag following the first time period;

if the attempt to establish the communication session over the computer network is successful, the scheduled call time is made available to another mobile electronic device; and when a communication session is established between the mobile device and the monitoring center over the computer network or the cellular network, information is conveyed between the mobile device and the monitoring center to enable the monitoring center to track the mobile device;

whereby the protocol conserves cellular network resources by attempting to convey said information to the monitoring center without use of the cellular network.

2. The computer-readable medium of claim 1, wherein a call is additionally placed over the cellular network between the mobile device and the monitoring center if the mobile device has been reported lost or stolen, regardless of whether or not the attempt to establish the communication session over the computer network is unsuccessful.

3. The computer-readable medium of claim 1, wherein the scheduled call time is assigned by the monitoring center to the mobile device prior to the attempt to establish the communication session over the computer network, and is selected to permit time-sharing of the telephone number by the multiple devices.

4. The computer-readable medium of claim 1, wherein the call is placed by the mobile device to the monitoring center.

5. The computer-readable medium of claim 4, wherein the mobile device places the call from a telephone number specified to the mobile device by the monitoring center, said telephone number selected based at least partly on a location of the mobile device.

6. The computer-readable medium of claim 1, wherein the call is placed by the monitoring center to the mobile device.

7. The computer-readable medium of claim 1, in combination with the monitoring center, wherein the monitoring center comprises a computer system that is configured to monitor a location of the mobile device, and based thereon, to assign telephone numbers to the mobile device for placing calls from the assigned telephone numbers over the cellular network.

8. The computer-readable medium and monitoring center of claim 7, wherein the monitoring center is additionally configured to assign the first time period and the call time to the mobile device.

9. The computer-readable medium and monitoring center of claim 7, wherein the monitoring center is additionally configured to instruct the agent in the mobile device to perform an anti-theft function.

10. A monitoring center, comprising:

a computer system configured to communicate with, and to monitor the locations of, a plurality of mobile electronic devices, the computer system programmed to:

assign to the mobile devices, based at least partly on the respective locations of the mobile devices, telephone numbers from which to call the monitoring center over a cellular network;

assign call times to the mobile devices for placing calls to the monitoring center over the cellular network; and when a mobile device conducts a communication session with the monitoring center without use of the cellular network, updating a call time assigned to the mobile device to postpone placement of a call by the mobile device over the cellular network and to make the call time available to another mobile device;

wherein the computer system is configured to assign the telephone numbers and call times to the mobile devices such that a single telephone number is time-shared by multiple mobile devices.

11. The monitoring center of claim 10, wherein the computer system is additionally configured to communicate with the mobile devices over a computer network, without use of the cellular network.

12. The monitoring center of claim 11, wherein the computer system is additionally configured to implement a protocol in which:
during a first time period assigned by the monitoring center, a mobile device attempts to establish a communication session with the monitoring center over the computer network; and
if the attempt is unsuccessful, the mobile device places a call to the monitoring center over the cellular network during a second time period assigned by the monitoring center.

13. A mobile device programmed to communicate with a monitoring system according to a method that comprises:
receiving, from the monitoring system, a call time assignment that specifies a call time for placing a call over a wireless telephone network to the monitoring system, said call time selected according to a method that enables multiple mobile devices to time-share a telephone number;
prior to a time lag preceding the assigned call time, attempting to establish a communication session with the monitoring session over a computer network without use of the wireless telephone network;
if the attempt to establish the communication session is successful, obtaining an updated call time assignment that postpones the call over the wireless telephone network to the monitoring system, said updated call time selected according to a method that enables multiple mobile devices to time-share a telephone number as a telephone number from which to place telephone calls; and
if the attempt to establish the communication session is unsuccessful, placing a call via the wireless telephone network to the monitoring system based on the assigned call time using a telephone number that is time-shared by multiple mobile devices.

14. The mobile device of claim 13, wherein obtaining the updated call time assignment comprises receiving an indication of the updated call time assignment from the monitoring system.

15. The mobile device of claim 13, wherein the mobile device is further programmed to transmit to the monitoring system information regarding a current location of the mobile device.

16. A method for controlling communications between a plurality of mobile electronic devices and a monitoring system, the method comprising the processor implemented steps of:
assigning a common telephone number to the plurality of mobile devices as a telephone number from which to place calls on a wireless telephone network to the monitoring system on a time-shared basis;
for each of the plurality of mobile devices, repeatedly performing a scheduling process that comprises:
scheduling a first time slot for an internet communication between the monitoring system and the mobile device; and
scheduling a second time slot for the mobile device to place a call on the wireless telephone network to the monitoring system using said telephone number, the second time slot falling after the first time slot by a selected time lag, said second time slot capable of being reassigned to a different mobile device of the plurality of mobile devices if the mobile device successfully uses the first time slot for the internet communication with the monitoring system;
wherein the scheduling process assigns the second time slots to the plurality of mobile devices on a non-conflicting basis such that the mobile devices can time-share the telephone number.

17. The method of claim 16, further comprising reassigning the second time slot to a second mobile device in response to the mobile device successfully using the first time slot for the internet communication with the monitoring system.

18. The method of claim 17, wherein reassigning the second time slot comprises extending a call placed by the second mobile device into the second time slot to thereby extend the call's duration.

19. The method of claim 16, further comprising selecting said telephone number based at least partly on locations of the mobile devices.

* * * * *